United States Patent [19]

Terry

[11] Patent Number: 5,552,034
[45] Date of Patent: Sep. 3, 1996

[54] FLUID CATALYTIC CRACKING PROCESS

[75] Inventor: Patrick H. Terry, Middletown, N.J.

[73] Assignee: Exxon Research and Engineering Company, Florham Park, N.J.

[21] Appl. No.: 259,209

[22] Filed: Jun. 13, 1994

Related U.S. Application Data

[63] Continuation-in-part of Ser. No. 64,569, May 19, 1993, Pat. No. 5,360,598, and Ser. No. 64,602, May 19, 1993, abandoned.

[51] Int. Cl.$^6$ ............... C10G 11/00; C10G 35/14
[52] U.S. Cl. ............. 208/113; 208/161; 208/164
[58] Field of Search ................... 208/113, 147, 208/148, 157, 158, 161, 163, 164

[56] References Cited

U.S. PATENT DOCUMENTS

| | | | |
|---|---|---|---|
| 3,993,556 | 11/1976 | Reynolds et al. | 208/75 |
| 4,402,913 | 9/1983 | McKinney | 422/110 |
| 4,464,250 | 8/1984 | Myers et al. | 208/120 |
| 4,574,044 | 3/1986 | Krug | 208/120 |

*Primary Examiner*—Asok Pal
*Assistant Examiner*—Bekir L. Yildirim
*Attorney, Agent, or Firm*—Richards D. Jordan; Roy J. Ott

[57] ABSTRACT

Disclosed is a fluid catalytic cracking process in which the catalytic cracking reaction takes place in a dilute phase, and the reaction product contains a reduced volume of off gas having a low concentration of $SO_x$ and $NO_x$. The use of off gas, which is produced during a regeneration step, to strip entrained vapor from spent catalytic cracking catalyst acts to reduce $SO_x$ and $NO_x$ byproducts, and eliminates the need to separately recover and treat the off gas stream from the regenerator portion of the system. The entire process, including the reaction step, the stripping step and the regeneration step, can be performed in a single vessel, and the stripping and reaction steps take place entirely in the dilute phase.

9 Claims, 1 Drawing Sheet

FLUID CATALYTIC CRACKING PROCESS

This is a continuation-in-part of U.S. application Ser. No. 08/064,567, filed May 19, 1993, now U.S. Pat. No. 5,360,598 and U.S. application Ser. No. 08/064,602, filed May 19, 1993, now abandoned.

FIELD OF THE INVENTION

This invention concerns a dilute phase fluid catalytic cracking system. More specifically, this invention concerns a fluid catalytic cracking process wherein the catalytic cracking, catalyst stripping, and catalyst regeneration steps take place in a dilute phase, and there is no regeneration off gas stream which contains $NO_x$, $SO_x$ and catalyst dust components. The invention also provides for a fluid catalytic cracking unit in which the dilute phase catalytic cracking reaction takes place.

BACKGROUND OF THE INVENTION

In general, commercial fluid catalytic cracking (FCC) processes are carried out in FCC units which are either side-by-side, where the unit includes a separate reactor vessel and a separate regenerator vessel adjacent to one another, or a stacked type of unit, where either the reactor vessel is stacked on top of the regenerator or vice versa. In these types of FCC units, the reactor is compartmentalized apart from the regenerator, meaning that there are separate overhead streams from both the reactor and the regenerator which require separate equipment to further treat each product stream.

Important to the FCC process is the location and control of the cracking reaction. Typically, FCC units have a discrete riser with some dense phase fluidized catalyst bed in the reactor vessel. With a highly active catalytic cracking catalyst, such as a zeolite catalyst, the dense phase bed height can be kept to a minimum, and primary control of the reaction can be accomplished by controlling the circulation rate of the catalyst.

Fresh feed and recycle streams in an FCC unit are typically preheated by heat exchangers or a furnace and enter the FCC unit in a feed riser which recirculates hot regenerated catalyst. The heat from the hot catalyst causes the fresh feed to vaporize. Vaporization may not be complete, however, if high boiling feeds are used or when large liquid droplets are present in the feed. Once the hydrocarbon vaporizes and mixes with the catalytic cracking catalyst, a fluid like suspension is formed, and the suspension is transported through the riser and to the reactor. As the feed contacts the hot catalyst in the riser, the cracking reaction begins. Typically, the riser empties the fluid like suspension of hydrocarbon and catalyst into the discrete phase bed in the reactor vessel, where a significant portion of the hydrocarbon is cracked.

Hydrocarbon cracking is a term which is well known in the art of petroleum refining and generally refers to the cracking of a large hydrocarbon molecule to a smaller hydrocarbon molecule by breaking at least one carbon to carbon bond. For example, large paraffin molecules can be cracked to a paraffin and an olefin, and a large olefin molecule can be cracked to two or more smaller olefin molecules. Long side chain molecules which may be present on aromatic rings or naphthenic rings can also be cracked.

As known in the art, catalytic cracking catalyst can be used to catalytically control a hydrocarbon cracking reaction. However, thermal cracking reactions also occur within the system. In addition, numerous side reactions accompany the cracking reactions. A few of the side reactions include dehydrogenation, cyclization, oligomerization, polymerization, hydrogen transfer and coke formation on the catalyst.

Hydrocarbon which is typically used as a feedstock for FCC units, contains sulfur and nitrogen in the form of organo-sulfur compounds and organo-nitrogen compounds. These types of compounds are quite extensive and are well documented. Examples of these compounds include compounds such as mercaptans, sulfides, disulfides, thiophenes, pyrroles and pyridines.

When a feedstock is cracked in an FCC unit, certain side reactions affect the sulfur and nitrogen components of the organo-sulfur and organo-nitrogen compounds in the hydrocarbon feedstream. Approximately 40–60% of the sulfur is converted to $H_2S$, about 35–55% of the sulfur remains in the liquid products, and about 5–10% of the sulfur ends up in the coke. The nitrogen in the feedstock is typically converted to $NH_3$, amines, cyanides, and hetero cyclic type compounds. The feed nitrogen compounds can be either basic in nature or non-basic, with the total nitrogen percentage being generally in the range of 0.05–1.0 wt %. Typically, 20–80% of the nitrogen compounds are basic.

The cracking reaction continues in the reaction system until the hydrocarbon components are separated from the catalyst. Cyclones are generally used as the separation means. The remainder of the vapor is essentially entrained with the catalyst. At this stage, the catalyst is also adsorbed with coke which is to be removed so that the catalyst can be reused.

Substantially all of the $NH_3$ and $H_2S$ produced during the cracking reaction is recovered with the separated vapor in the reactor overhead. A portion of the nitrogen and sulfur compounds, however, are retained in the coke which is adsorbed to the catalyst.

The coked catalytic cracking catalyst is sent to the regenerator portion of the FCC unit for coke removal. In the regenerator, the coke is burned from the catalyst with an oxygen containing stream such as air. This burning reaction oxidizes the nitrogen and sulfur in the adsorbed coke forming, inter alia, $NO$, $NO_2$, $NO_3$, $SO_2$ and $SO_3$. If air is used as the oxygen containing stream, a significant portion of the nitrogen in the stream will also oxidize, forming $NO$, $NO_2$ and $NO_3$. Collectively, these compounds are referred to as $NO_x$ and $SO_x$ components.

After the $NO_x$ and $SO_x$ components are formed in the FCC regenerator, they are discharged as part of the flue gas stream. Because the $NO_x$ and $SO_x$ content of the flue gas stream may be at a higher concentration than is acceptable, the flue gas stream is typically further treated using additional equipment.

Due to the high temperatures and stresses placed on the catalytic cracking catalyst, attrition of the catalyst may occur. This attrition may produce catalyst fines (i.e., catalyst dust) which may also exit the catalytic cracking system in the regenerator off gas stream. Catalyst fines are catalyst particles which are less than about 40 µm in diameter.

A problem inherent in known FCC units is that reduction of $SO_x$ and $NO_x$ components in the flue gas stream is costly in that much additional treatment is required. In addition, an excessive amount of catalyst fines in the flue gas stream can cause an undesirable increase in particulate emissions.

Another problem in known FCC units is that only a low concentration of oxygen in the oxygen stream can be tolerated in the regenerator for burning the coke from the catalyst. In general, if the oxygen content of the oxygen stream is too high, the temperature within the coked catalyst particles will be elevated to a point where there will be catalyst degradation.

Known FCC units typically use dense bed reaction and regeneration systems. These systems are not particularly desirable, however, since a relatively large amount of catalyst must be maintained in the FCC unit. If the amount of catalyst in the unit can be reduced, the entire system can be more easily controlled. This will result in more complete removal of coke from spent catalyst which leads to increased hydrocarbon conversion, meaning that the catalyst will be in a more active state. This also means that less fresh catalyst make-up will be required.

U.S. Pat. No. 4,464,250 is one example of a known FCC process. The process disclosed uses a part of the regeneration gas to strip hydrocarbon from the spent catalyst prior to regeneration. The stripping step is also performed in the dense phase.

SUMMARY OF THE INVENTION

It is an object of this invention to overcome many of the problems inherent in the operation of known FCC units. In order to overcome these problems the invention provides a fluid catalytic cracking process which comprises the steps of reacting hydrocarbon with a catalytic cracking catalyst in a dilute phase to form a dilute phase reaction medium comprising hydrocarbon, cracked hydrocarbon and coked catalytic cracking catalyst; separating and recovering the cracked hydrocarbon from the dilute phase reaction medium; stripping hydrocarbon and cracked hydrocarbon entrained with the separated, coked catalytic cracking catalyst with a stripping gas to reduce $NO_x$ and $SO_x$ compounds, wherein the stripping takes place entirely in a dilute phase, and regenerating the separated, coked catalytic cracking catalyst by heating the coked catalytic cracking catalyst at a temperature of about 1100°–1400° F. in the presence of a regenerating gas containing at least about 21% oxygen to remove the coke from the coked catalytic cracking catalyst and to form the stripping gas which is used in the stripping step.

BRIEF DESCRIPTION OF THE DRAWINGS

The present invention will be better understood by reference to the Detailed Description of the Invention when taken together with the attached drawings, wherein.

DETAILED DESCRIPTION OF THE INVENTION

Figure 1:
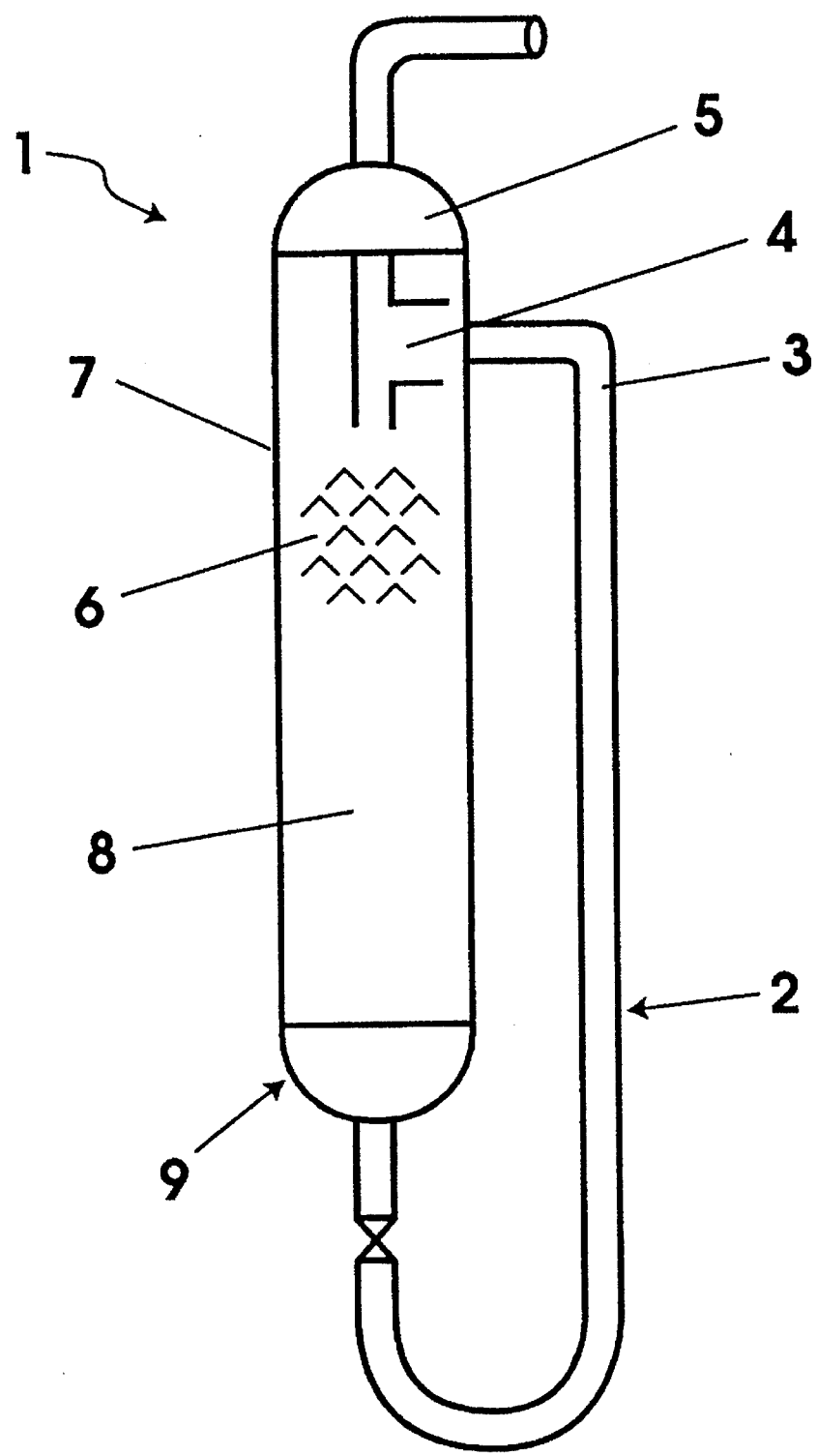
FIG. 1 shows a preferred embodiment of the catalytic cracking system which incorporates an unpartitioned reaction chamber to perform both the final reaction step, the stripping step, and the regeneration step of the catalytic cracking process.

A preferred embodiment of this invention will be described with reference to the drawing. The drawing provides illustrated support for the description of the preferred embodiments and is not to be used to further limit the invention from what is claimed.

FIG. 1 shows a preferred embodiment of the catalytic cracking system of this invention. The catalytic cracking system includes a fluid catalytic cracking (FCC) unit 1, in which a FCC reaction process takes place.

Hydrocarbon feed 2 is input to the FCC unit 1 through a dilute phase reaction means 3. The dilute phase reaction means 3 is preferably a riser, and the hydrocarbon feed 2 is preferably a petroleum hydrocarbon. More preferably, the hydrocarbon feed 2 is a petroleum distillate having an ASTM boiling range of about 600°–1200° F. However, heavy residuum can also be present in the distillate.

The hydrocarbon feed 2 which is introduced into the dilute phase reaction means 3 can be in liquid form but will substantially vaporize once inside the dilute phase reaction means 3. Vaporization takes place as a result of contact of the hydrocarbon with hot recirculating catalytic cracking catalyst within the dilute phase reaction means 3.

The catalytic cracking catalyst is typically any type of known catalyst which is typically used in FCC systems. Preferably, the catalyst is a high activity crystalline zeolite composition, which is known in the art.

As the hydrocarbon vaporizes upon mixing with the catalytic cracking catalyst, a dilute phase cracking reaction takes place in the dilute phase reaction means 3, creating a dilute phase reaction medium. The dilute phase reaction medium includes, inter alia, cracked hydrocarbon, a small amount of unreacted hydrocarbon, $NH_3$, $H_2S$ and catalyst.

As described herein, it is preferable that the dilute phase has a density that is between about the density of the vapor components included in the medium and about 10 lbs/ft$^3$. It is further preferred that the dilute phase has a density of about 0.5–4 lbs/ft$^3$, most preferably about 1–1.5 lbs/ft$^3$.

Preferably, the dilute phase cracking reaction takes place at a temperature of about 850°–1200° F., more preferably from about 950°–1100° F. It is also preferable that the dilute phase reaction take place at a pressure of about 0–150 psig, more preferably about 5–100 psig.

In general, at least about 75 wt % of the hydrocarbon is cracked within the dilute phase reaction means 3. Preferably, at least about 90 wt % of the hydrocarbon will be cracked within the dilute phase reaction means 3. By maintaining a relatively high conversion efficiency of hydrocarbon to cracked hydrocarbon product in the dilute phase, a dense bed reaction medium will not be required. An advantage in not having to use a dense bed reaction medium is that less catalytic cracking catalyst will be needed in the FCC unit.

As the dilute phase reaction takes place and hydrocarbon is cracked to form the cracked hydrocarbon product, the catalytic cracking catalyst becomes spent. This means that the catalytic cracking catalyst becomes coated with coke material. This coke material is generally a carbonaceous material which deactivates the catalytic cracking catalyst.

The dilute phase reaction medium is collected from the dilute phase reaction means 3 by a dilute phase collecting and separating means 4. Within the dilute phase collecting and separating means 4, a significant portion of the cracked hydrocarbon is separated from the dilute phase reaction medium. Preferably, about 90–95% of the vapor in the dilute phase reaction medium is separated in the dilute phase collecting and separating means 4 on the initial pass.

The dilute phase collecting and separating means 4 is preferably a cyclone system. Preferred types of cyclone systems include riser cyclones, closed cyclones, or inertial types of riser terminations, with the closed cyclones being more preferred.

After separation by the dilute phase collecting and separating means 4, the cracked hydrocarbon is collected in a product collecting means 5. Preferably, the product collecting means 5 is a plenum chamber located above the dilute phase collecting and separating means 5.

After the cracked hydrocarbon is separated from the dilute phase reaction medium, the remainder of the medium passes from the dilute phase collecting and separating means 4 to a stripping means 6. The remainder of the medium will generally include small amounts of gaseous material entrained with the spent catalytic cracking catalyst. The gaseous material will generally include cracked hydrocarbon (about 3–10 wt % of the hydrocarbon feed) and unreacted hydrocarbon (about 0–2 wt % of the hydrocarbon feed). This gaseous material also includes $H_2$, $H_2S$ and $NH_3$, as well as many other byproducts. The total content of gaseous material entrained with the catalyst will be about 3–10 wt % of the hydrocarbon feed.

As the spent catalyst and entrained gaseous material moves across the stripping means 6, a stripping gas is passed countercurrently across the stripping means 6, stripping the entrained gaseous material from the spent catalyst. The stripping step of this invention takes place entirely in the dilute phase. That is, the entrained gaseous material is stripped from the spent catalyst entirely in the dilute phase so that backmixing will be at a minimum.

In this invention, the stripping gas is formed as the spent catalyst is regenerated in a regenerator means 8. As the spent catalyst moves from the stripping means 6 to the regenerator means 8, it is contacted countercurrently with a regeneration gas. The regeneration gas can be input to the regenerator means 8 through an injecting means 9. It is preferably that all of the regeneration gas formed in the regenerator means 8 be used as the stripping gas to strip the entrained gas from the spent catalyst in the stirpping means 6. By using all of the regeneration gas as the stripping gas, $NO_x$, $SO_x$ and particulate matter can be greatly reduced.

Preferably, the regeneration gas contains oxygen at a concentration of at least about 21 wt %, more preferably at least about 40 wt %, and most preferably at least about 75 wt %. As the regeneration gas contacts the spent catalyst, the coke material on the spent catalyst is combusted, forming the stripping gas. The combustion process generally takes place at a temperature that is somewhat higher than the reaction temperature. Preferably, the combustion process takes place at about 1100–1140° F. The carbon content of the catalyst following the combustion process will preferably be less than about 0.1 wt %.

The stripping gas is actually a flue gas that is formed during the regeneration step. This gas comprises, inter alia, $NO_x$, $SO_x$, $O_2$, $CO$, $CO_2$ and $N_2$. Because the flue gas is used as the stripping gas in this invention, there will be contact between the flue gas components and the $H_2$, $H_2S$ and $NH_3$ components which are stripped from the catalytic cracking catalyst in the stripping means 6. One result of this contact is that the $NO_x$ and $SO_x$ components of the flue gas will be reduced, forming $N_2$, $H_2S$ and $H_2O$. This means that all of the gas formed during the regeneration step can be used as the stripping gas such that separate recovery and treatment of the regenerator flue gas stream can be eliminated.

In the preferred embodiment shown in FIG. 1, the FCC unit includes an unpartitioned reaction chamber 7 which is used to both crack the hydrocarbon feed and regenerate the spent catalytic cracking catalyst. Having an unpartitioned reaction chamber means that there are no structural means actively forming a dense phase reaction bed. Using this type of arrangement, the catalytic cracking reacting reaction will take place only in the dilute phase, greatly reducing the complexity of the system.

Although an unpartitioned vessel is illustrated in FIG. 1, other vessels or combinations of vessels can be used which allow the flue gas from the regenerator portion to be used as a stripping medium. For example, it is possible to arrange various combinations of the dilute phase reaction means, the dilute phase separating means, the stripping means and the regenerator means in side-by-side relationships as long as the catalytic cracking reaction is in the dilute phase and the flue gas from the regenerator means is used as a stripping gas in the stripping means.

Having now fully described this invention, it will be appreciated by those skilled in the art that the same can be performed within a wide range of equivalent parameters of composition and conditions without departing from the spirit or scope of the invention or any embodiment thereof.

What is claimed is:

1. A fluid catalytic cracking process comprising:
    (a) reacting hydrocarbon with a catalytic cracking catalyst in a dilute phase reactor to form a dilute phase reaction medium having a density of less than about 10 lbs/ft$^3$ and comprising hydrocarbon, cracked hydrocarbon and coked catalytic cracking catalyst;
    (b) separating and recovering the cracked hydrocarbon from the dilute phase reaction medium;
    (c) stripping hydrocarbon, $H_2$, $H_2S$, $NH_3$ and cracked hydrocarbon entrained with the separated, coked catalytic cracking catalyst with a stripping gas containing $NO_x$ and $SO_x$ wherein the stripping takes place substantially entirely in a dilute phase and the $NO_x$ and $SO_x$ content is reduced by reaction with $H_2$, $H_2S$ and $NH_3$; and
    (d) regenerating the separated, coked catalytic cracking catalyst by heating the coked catalytic cracking catalyst at a temperature of about 1100°–1400° F. in the presence of a regenerating gas containing at least about 21% oxygen to remove the coke from the coked catalytic cracking catalyst and to form the stripping gas which is used in the stripping step to thereby reduce $NO_x$ and $SO_x$.

2. The fluid catalytic cracking process of claim 1 wherein the dilute phase reactor is a riser reactor and wherein the regenerating gas is contacted countercurrently with the coked catalytic cracking catalyst.

3. The fluid catalytic cracking process of claim 2 wherein the regenerating gas contains at least about 40% oxygen.

4. The fluid catalytic cracking process of claim 3 where substantially all of the stripping gas formed in the regeneration step is used in the stripping step.

5. The fluid catalytic cracking process of claim 4 wherein the regenerated catalytic cracking catalyst is recycled to react with the hydrocarbon in the riser reactor.

6. A fluid catalytic cracking (FCC) process conducted in an FCC system comprising a riser reactor in communication with a single, unpartitioned vessel having a separation zone, a stripping zone and a regeneration zone, which process comprises:
    (a) contacting hydrocarbon feed with an FCC catalyst in the riser reactor to produce hydrocarbon product and coked FCC catalyst entrained with hydrocarbon product;
    (b) introducing the hydrocarbon product and coked FCC catalyst into the separation zone located in the upper section of the vessel to separate the hydrocarbon product from the coked FCC catalyst;
    (c) withdrawing the separated hydrocarbon product from the vessel;
    (d) contacting the separated coked FCC catalyst as substantially entirely a dilute phase with a stripping gas in the stripping zone of the vessel located below the separation zone of the vessel to strip entrained hydrocarbon product and $H_2$, $H_2S$ or $NH_3$ from the coked FCC catalyst, whereby the $H_2$, $H_2S$ or $NH_3$ reacts with $SO_x$ and $NO_x$ produced in step (e);

(e) regenerating the coked FCC catalyst with a regenerating gas in the regeneration zone of the vessel located below the stripping zone of the vessel to burn coke from the coked FCC catalyst and to form a stripping gas containing $SO_x$ and/or $NO_x$ which is used as the stripping gas in the stripping zone of the vessel to thereby reduce $NO_x$ and $SO_x$ formation.

7. The fluid catalytic cracking process of claim 6 wherein the stripping takes place substantially entirely in a dilute phase.

8. The fluid catalytic cracking process of claim 7 wherein substantially all of the stripping gas formed in the regeneration step is used in the stripping step.

9. The fluid catalytic cracking process of claim 8 wherein the regenerated catalytic cracking catalyst is recycled to react with hydrocarbon in the riser reactor.

* * * * *